US009796469B2

(12) United States Patent
Loftus, Jr. et al.

(10) Patent No.: US 9,796,469 B2
(45) Date of Patent: Oct. 24, 2017

(54) MODULAR ROTOR CRAFT ROTOR HUB SYSTEM

(71) Applicant: The Boeing Company, Seal Beach, CA (US)

(72) Inventors: Robert T. Loftus, Jr., Gilbert, AZ (US); Jeremy Clay Hill, Mesa, AZ (US); Saul Opie, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 549 days.

(21) Appl. No.: 14/245,113

(22) Filed: Apr. 4, 2014

(65) Prior Publication Data

US 2015/0284077 A1    Oct. 8, 2015

(51) Int. Cl.
| | |
|---|---|
| *B64C 27/50* | (2006.01) |
| *B64C 27/35* | (2006.01) |
| *B64C 27/54* | (2006.01) |
| *B64C 27/39* | (2006.01) |

(52) U.S. Cl.
CPC ............ *B64C 27/35* (2013.01); *B64C 27/39* (2013.01); *B64C 27/54* (2013.01); *Y10T 29/49332* (2015.01)

(58) Field of Classification Search
CPC ... Y10T 29/49332; B64C 27/39; B64C 27/54; B64C 27/35
USPC ..................................................... 416/134 A
See application file for complete search history.

(56) References Cited

U.S. PATENT DOCUMENTS

| | | | | |
|---|---|---|---|---|
| 3,200,887 A | * | 8/1965 | Ballauer | B64C 27/35 416/134 A |
| 3,556,673 A | * | 1/1971 | Killian | B64C 27/35 416/134 R |
| 3,589,835 A | * | 6/1971 | Linden | B64C 27/32 416/103 |
| 3,652,185 A | * | 3/1972 | Cresap | B64C 27/32 416/134 A |
| 3,700,352 A | * | 10/1972 | Gorndt | B64C 27/35 416/134 A |
| 3,759,632 A | * | 9/1973 | Rybicki | B64C 27/32 416/134 A |
| 3,782,854 A | | 1/1974 | Rybicki | |
| 3,862,812 A | * | 1/1975 | Gorndt | B64C 27/35 416/134 R |
| 4,089,211 A | * | 5/1978 | Vercellone | G01M 13/04 73/797 |

(Continued)

FOREIGN PATENT DOCUMENTS

| | | |
|---|---|---|
| EP | 1752375 A2 | 2/2007 |
| RU | 2376201 C1 | 12/2009 |

OTHER PUBLICATIONS

European Search Report for application No. 15162498.8, dated Jul. 31, 2015, pp. 7.

*Primary Examiner* — Craig J Price
(74) *Attorney, Agent, or Firm* — Armstrong Teasdale LLP (57) ABSTRACT

A rotor arm assembly for use in a rotor craft rotor hub system includes a pitch shaft and a plurality of discrete bearings coupled to the pitch shaft. The plurality of bearings are elastomeric bearings configured to facilitate movement of the rotor arm assembly about a plurality of degrees of freedom. A respective one of the plurality of bearings is configured to accommodate a single degree of freedom.

15 Claims, 7 Drawing Sheets

(56) References Cited

U.S. PATENT DOCUMENTS

| | | | | |
|---|---|---|---|---|
| 4,129,403 A * | 12/1978 | Watson | ............... | B64C 27/48 416/134 A |
| 4,135,856 A * | 1/1979 | McGuire | ............... | B64C 27/32 416/134 A |
| 4,142,833 A * | 3/1979 | Rybicki | ............... | B64C 27/35 384/221 |
| 4,251,187 A * | 2/1981 | Hollrock | ............... | B64C 27/35 403/226 |
| 4,333,728 A * | 6/1982 | Drees | ............... | B64C 27/43 416/134 A |
| 4,341,499 A * | 7/1982 | Peterson | ............... | B64C 27/35 416/134 A |
| 4,361,415 A * | 11/1982 | Aubry | ............... | B64C 27/35 416/134 A |
| 4,369,019 A * | 1/1983 | Lovera | ............... | B64C 27/35 416/134 A |
| 4,543,040 A | 9/1985 | McArdle et al. | | |
| 4,630,998 A * | 12/1986 | Leman | ............... | B64C 27/605 416/114 |
| 4,986,735 A * | 1/1991 | Robinson | ............... | F16F 1/393 416/134 A |
| 5,165,853 A * | 11/1992 | Pancotti | ............... | B64C 27/35 416/134 A |
| 5,407,325 A * | 4/1995 | Aubry | ............... | B64C 27/51 416/106 |
| 5,601,408 A * | 2/1997 | Hunter | ............... | B64C 27/35 267/141.1 |
| 6,050,778 A * | 4/2000 | McArdle | ............... | B64C 27/32 29/450 |
| 6,309,182 B1 | 10/2001 | Muylaert | | |
| 6,413,048 B1 | 7/2002 | Muylaert | | |
| 6,481,894 B1 * | 11/2002 | James | ............... | F16C 27/063 384/202 |
| 6,688,767 B2 * | 2/2004 | Schellhase | ............... | B64C 27/39 384/222 |
| 6,889,965 B2 | 5/2005 | Loftus et al. | | |
| 8,511,997 B2 * | 8/2013 | Cunningham | ............... | B64C 27/35 267/141.1 |
| 8,926,281 B2 * | 1/2015 | Stamps | ............... | B64C 27/35 416/134 A |
| 9,068,621 B1 * | 6/2015 | Halladay | ............... | F16F 1/40 |
| 9,085,357 B2 * | 7/2015 | Davis | ............... | B64C 27/32 |
| 9,327,832 B2 * | 5/2016 | Sottiaux | ............... | B64C 27/35 |
| 2003/0108258 A1 | 6/2003 | Schellhase et al. | | |
| 2006/0027957 A1 | 2/2006 | Mueller | | |

* cited by examiner

MODULAR ROTOR CRAFT ROTOR HUB SYSTEM

BACKGROUND

The present disclosure relates to a modular rotor craft rotor hub system and methods of assembling the same, and more particularly, to a modular rotor craft rotor hub system that includes fully articulated rotor arm assemblies having discrete bearings for each degree of freedom.

A key component of a rotor craft is the main rotor hub system. It provides attachment of the main rotor blades during operation. Rotational power is delivered to the main rotor hub system to provide rotational velocity to the blades in order to create aerodynamic lift. The main rotor hub system must allow for rotational motion of the blades in the vertical (flap), horizontal (lead-lag), and axial (pitch) directions near the blade root attachment with the hub to accommodate flight control authority and dynamic stability. Main rotor hub systems that accommodate these motions with discrete hinge mechanisms are referred to as fully articulated hub systems.

At least some known fully articulated rotor hub systems provide beneficial design kinematics, but struggle to provide these rotational freedoms with bearing systems that can accommodate high frequency and high amplitude oscillatory motion under high thrust loading created by the centrifugal force of the rotating blades. One known hub system is a non-friction bearing system such as a ball or roller bearing system. The lubricants and seals of these types of bearing systems are susceptible to moisture extrusion and leakage and therefore demand frequent maintenance that often requires removal and disassembly of the entire rotor hub to service. Another known hub system is a strap pack hub system that includes stretch straps formed from expensive specialized steel. At least some known strap pack hubs systems experience severe and complicated loadings and therefore stress states, resulting in strict damage criteria and frequent replacement often requiring removal and disassembly of the hub. Furthermore, failure of non-friction and strap pack hub systems may be difficult to detect and their low damage tolerance may quickly lead to aircraft damage or failure. Moreover, many known non-friction and strap pack hub systems currently perform at a maximum power limit and may not be able to handle an increase in induced loads, within their current physical envelops, without failure.

It has been known for some time that the use of elastomeric bearings in a rotor hub system would eliminate weight, the need of lubrication and would minimize maintenance. As such, at least some known rotor hub systems include spherical elastomeric bearings to accommodate for the flap and pitch degrees of freedom such that these are not handled by discrete bearings but by a single spherical bearing. As a result of consolidating these motions, the dynamic qualities of the rotor hub system have to be carefully considered, modeled, and controlled to assure aircraft stability. For this reason, replacing many legacy hubs, such as non-friction and strap pack hub systems, with an elastomeric hub system utilizing spherical bearings for flap compliance would entail a large design and analysis effort, often being cost prohibitive. More specifically, spherical elastomeric bearings have similar footprints to non-friction and strap pack hubs, but the dynamics and kinematics are much different, requiring significant research and development costs to implement a spherical elastomeric bearing hub system on an aircraft having strap-pack or roller bearing based legacy hubs.

BRIEF DESCRIPTION

In one aspect, a rotor arm assembly for use in a rotor craft rotor hub system is provided. The rotor arm assembly includes a pitch shaft and a plurality of discrete bearings coupled to the pitch shaft. The plurality of bearings are elastomeric bearings configured to facilitate movement of the rotor arm assembly about a plurality of degrees of freedom. A respective one of the plurality of bearings is configured to accommodate a single degree of freedom.

In another aspect, a rotor hub system for use in a rotor craft is provided. The rotor hub system includes a center body configured to rotate about a rotational axis and a plurality of modular rotor arms configured to couple to the center body. Each of the plurality of rotor arm assemblies includes a pitch shaft and a plurality of discrete bearings coupled to the pitch shaft. The plurality of bearings are elastomeric bearings configured to facilitate movement of the rotor arm assembly about a plurality of degrees of freedom. A respective one of the bearings is configured to accommodate a single degree of freedom.

In yet another aspect, a method of assembling a rotor arm assembly for use in a rotor craft is provided. The method includes providing a pitch shaft that includes a first portion and a second portion perpendicular to the first portion. A pair of flap bearings are coupled to the second portion. The method also includes coupling an inboard pitch bearing to the first portion proximate the second portion and coupling an outboard pitch bearing at a distal end of the first portion. The pair of flap bearings, the inboard pitch bearing, and the outboard pitch bearing are discrete elastomeric bearings configured to facilitate movement of the rotor arm assembly about a plurality of degrees of freedom The features, functions, and advantages that have been discussed can be achieved independently in various embodiments or may be combined in yet other embodiments further details of which can be seen with reference to the following description and drawings.

DETAILED DESCRIPTION

The implementations described herein relate to a modular rotor hub system for use with a rotor aircraft. More specifically, the modular rotor craft rotor hub system includes fully articulated rotor arm assemblies having discrete bearings for each degree of freedom. As used herein, the term "discrete" is meant to describe that each degree of freedom of the rotor arm assemblies is facilitated by an independent and distinct bearing such that no two or more degrees of freedom are facilitated by a single bearing element. In the exemplary implementation, each rotor arm assembly includes a pitch shaft having a first portion and a second portion perpendicular to the first portion. A pair of flap bearings are coupled to the second portion. An inboard pitch bearing is coupled to the first portion proximate the second portion and an outboard pitch bearing is coupled at a distal end of the first portion. The pair of flap bearings, the inboard pitch bearing, and the outboard pitch bearing are discrete elastomeric bearings configured to facilitate movement of the rotor arm assembly about a plurality of degrees of freedom, wherein no two or more degrees of freedom are accommodated by a single bearing.

Figure 1:
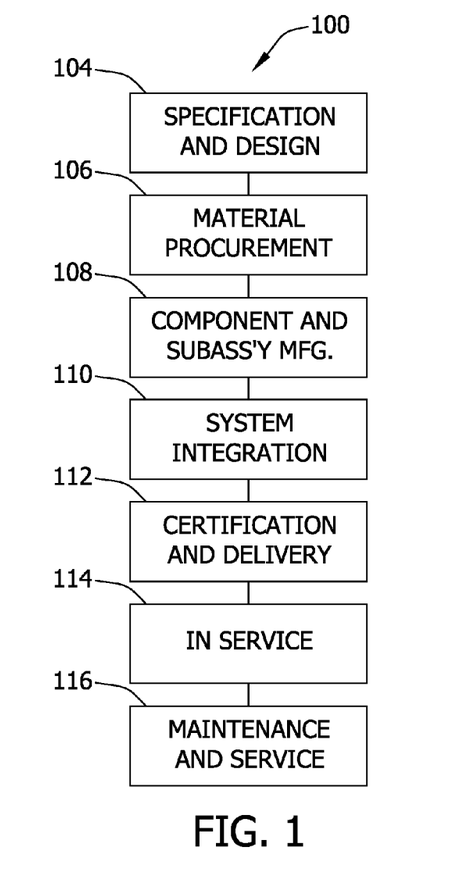
FIG. 1 is a flow diagram of an exemplary aircraft production and service methodology.
Figure 2:
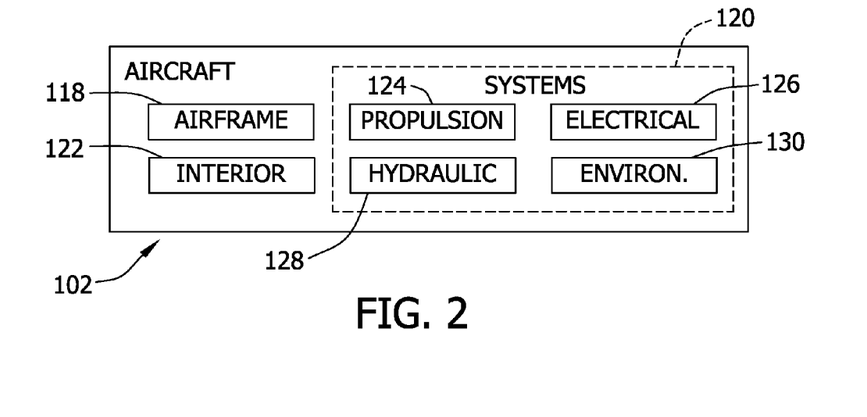
FIG. 2 is a block diagram of an exemplary aircraft.

Referring FIG. 1, implementations of the disclosure may be described in the context of an aircraft manufacturing and service method 100 and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to, airplanes, unmanned aerial vehicles (UAVs), gliders, helicopters, rotor craft, and/or any other object that travels through airspace. Further, in an alternative implementation, the aircraft manufacturing and service method described herein may be used in any manufacturing and/or service operation.

Figure 3:
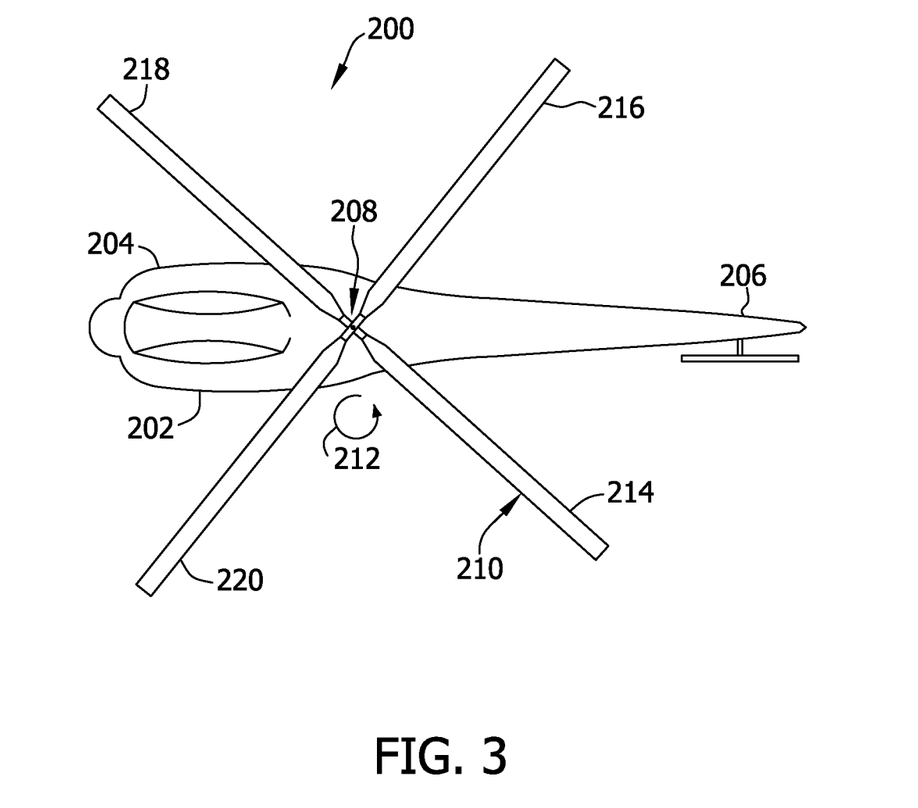
FIG. 3 is a top view of an aircraft illustrating a plurality of rotor blades and an exemplary rotor hub system.

FIG. 3 illustrates an aircraft 200, which may be substantially similar to aircraft 102. In the exemplary implementation, aircraft 200 is a rotor craft that includes a fuselage 202 having a forward section 204 and an aft section 206 (e.g., a tail section) rearward of forward section 204. As used herein, the term "rotor craft" may include any heavier-than-air flying craft that uses rotor blades revolving around a mast to generate and sustain lift. Examples of rotor craft may include, but are not limited to, helicopters, tilt-rotor aircraft, cyclocopters, and gyroynes. Rotor craft 200 also includes a rotor hub system 208, extending upwards from forward section 204 of fuselage 202, and a plurality of rotor blades 210 coupled to rotor hub system 208 configured for rotation about a rotor axis 212. In some implementations, rotor craft 200 may include more than one rotor hub system 208. In the exemplary implementation, rotor hub system 208 includes four rotor blades, for example, a first rotor blade 214, a second rotor blade 216, a third rotor blade 218, and a fourth rotor blade 220. However, embodiments that incorporate fewer or additional rotor blades are contemplated. Generally, when deployed for flight operations, the rotor blades are evenly spaced. For example, in the illustrated embodiment, and described above, the blades are spaced at 90 degree intervals. For a six blade configuration, the spacing would be at 60 degrees.

Figure 4:
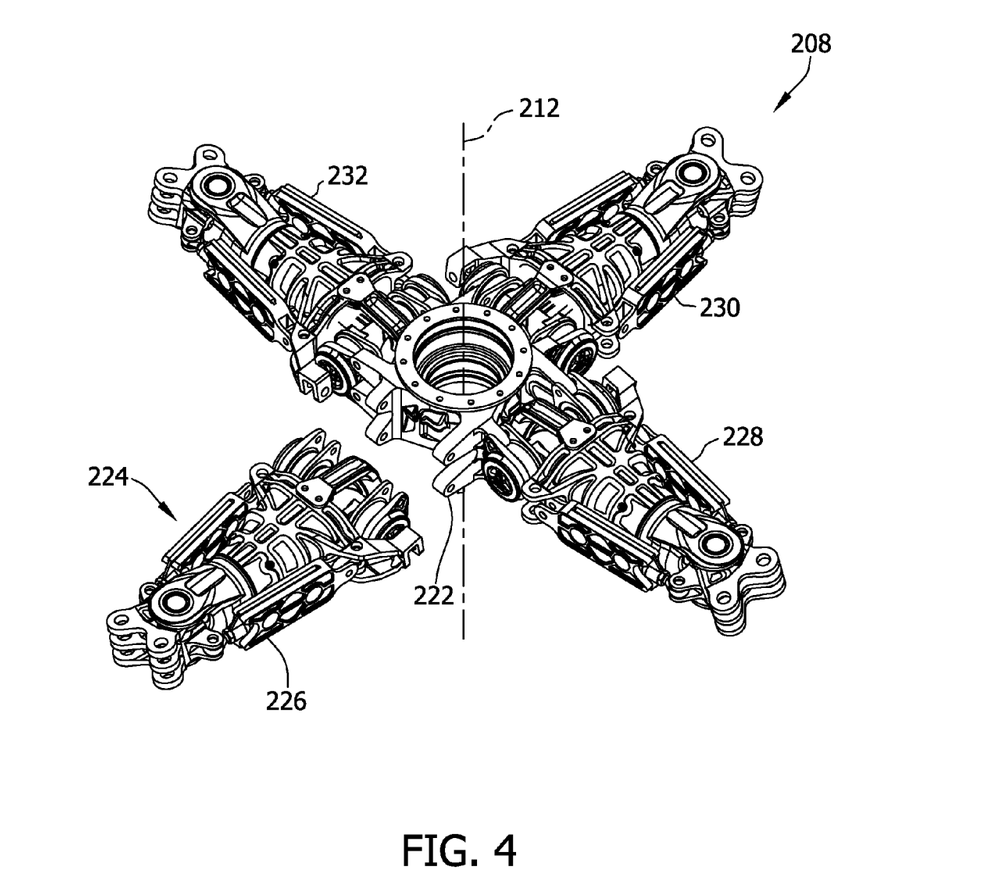
FIG. 4 is a perspective view of the rotor hub system shown in FIG. 3 having a center body and a plurality of rotor arm assemblies.
Figure 5:
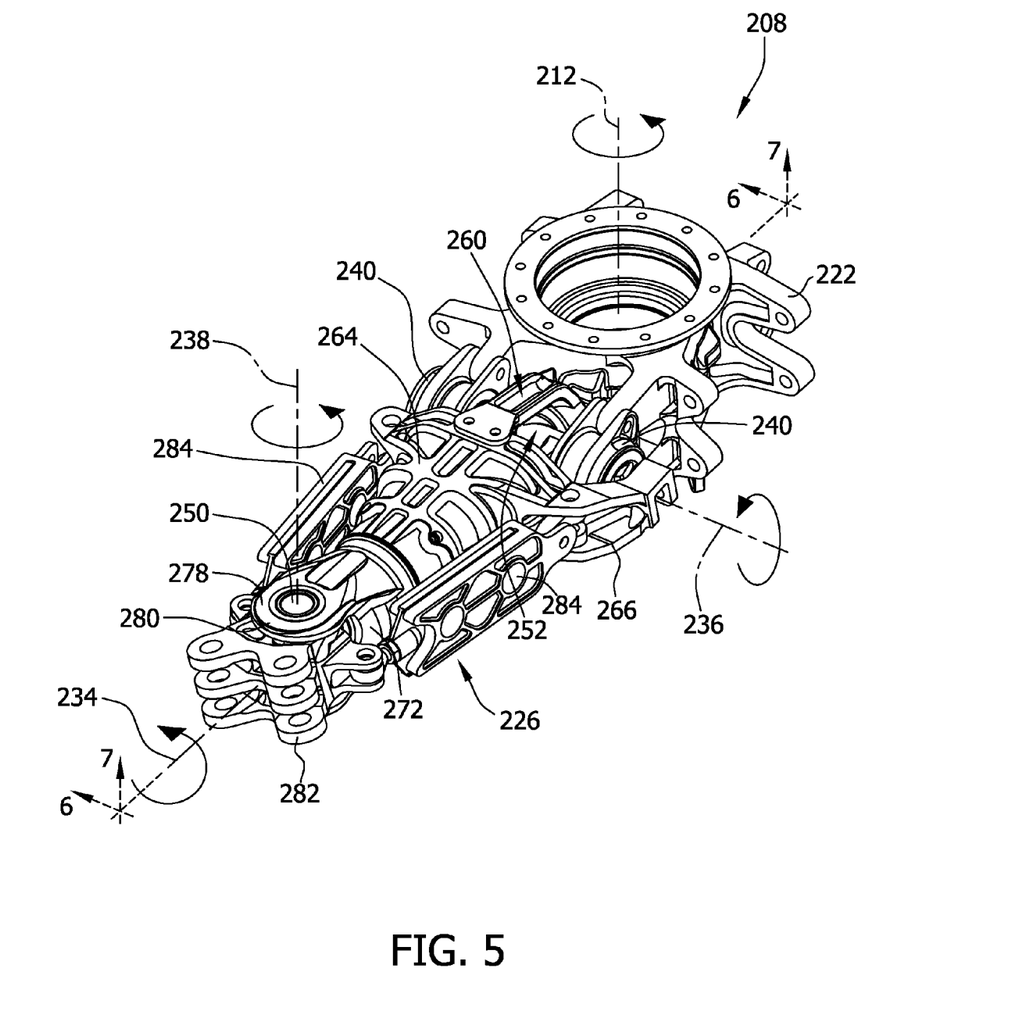
FIG. 5 is a perspective view of the center body and a single rotor arm assembly shown in FIG. 4.
Figure 6:
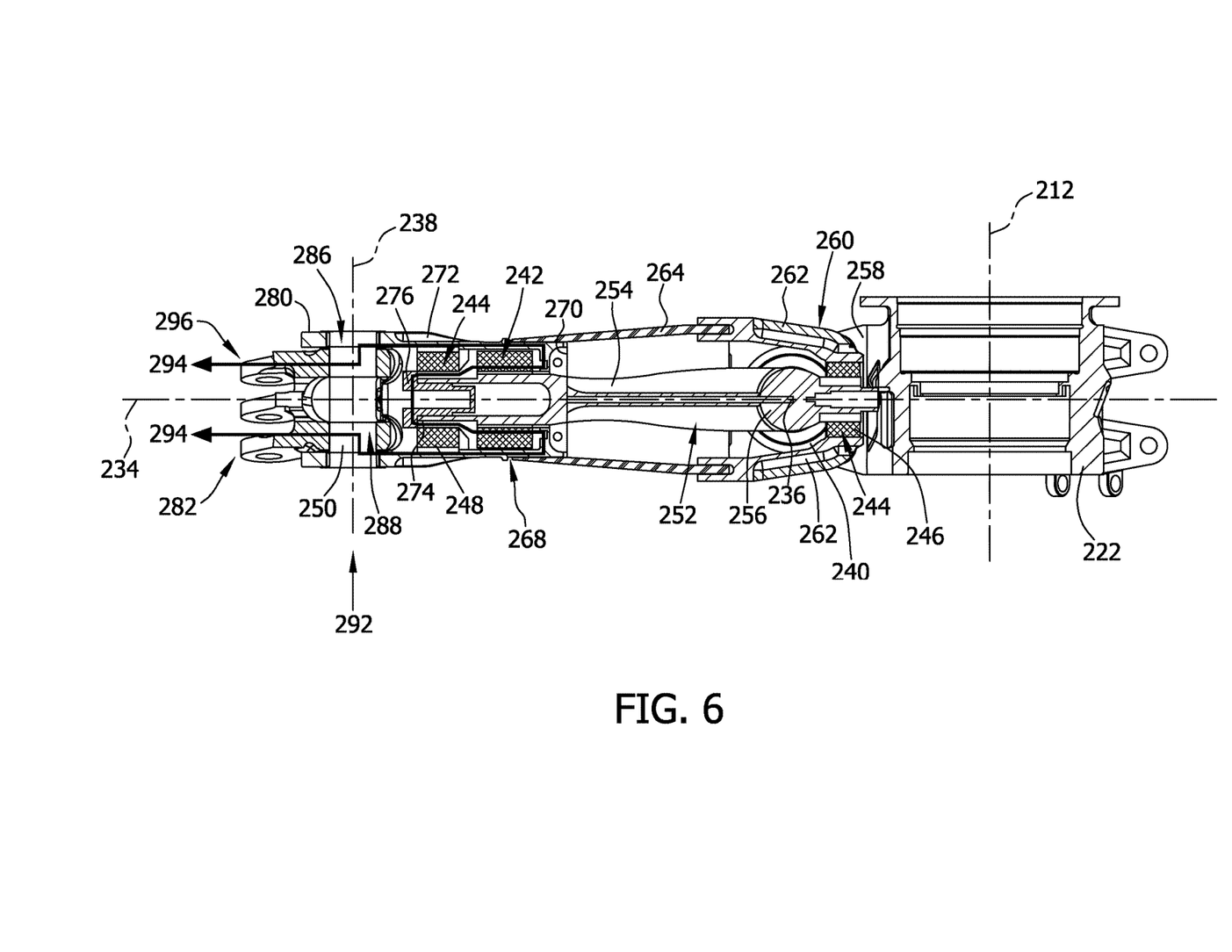
FIG. 6 is a cross-sectional side view of the center body and rotor arm assembly shown in FIG. 5.
Figure 7:
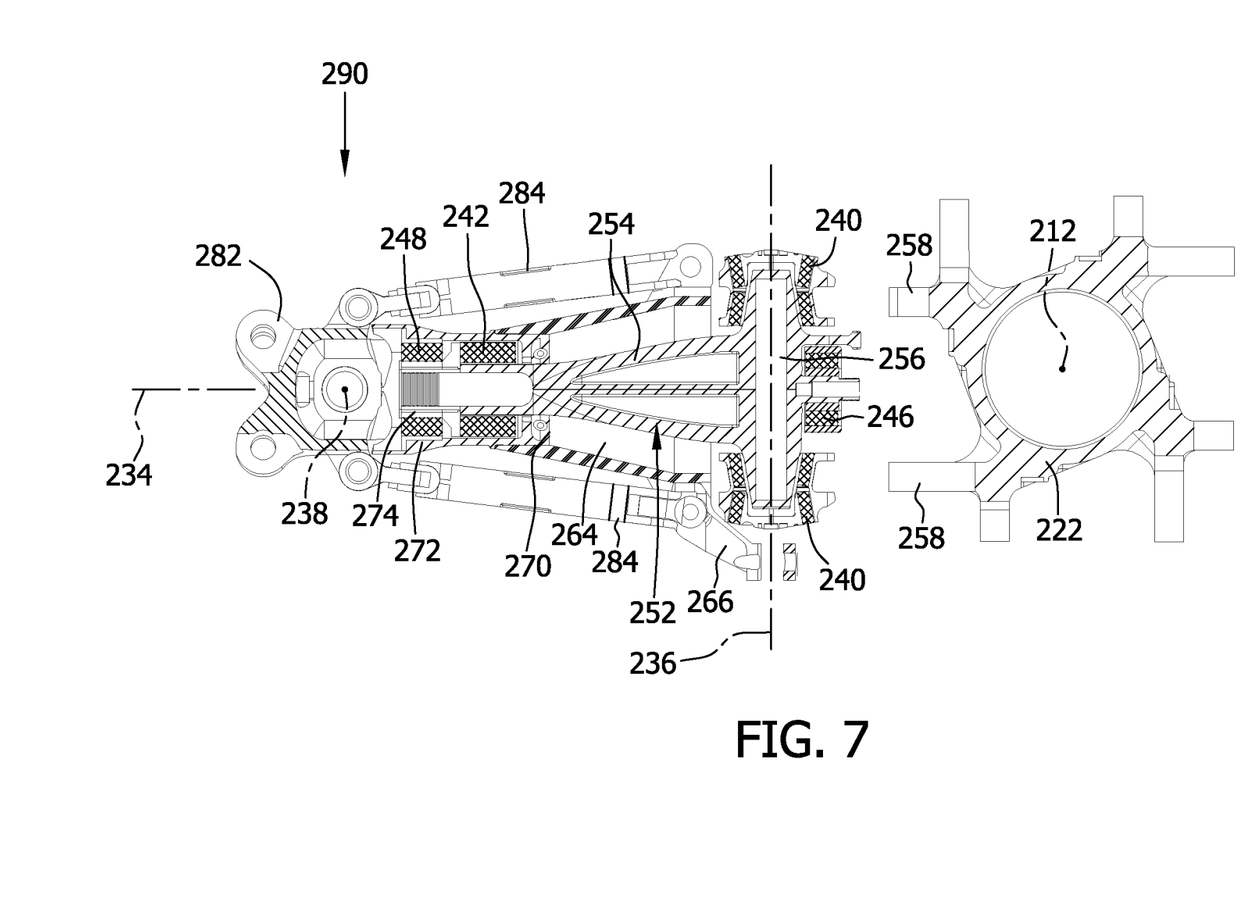
FIG. 7 is a cross-sectional top view of the center body and rotor arm assembly shown in FIG. 5 with the center body shown separate from the rotor arm assembly.
Figure 8:
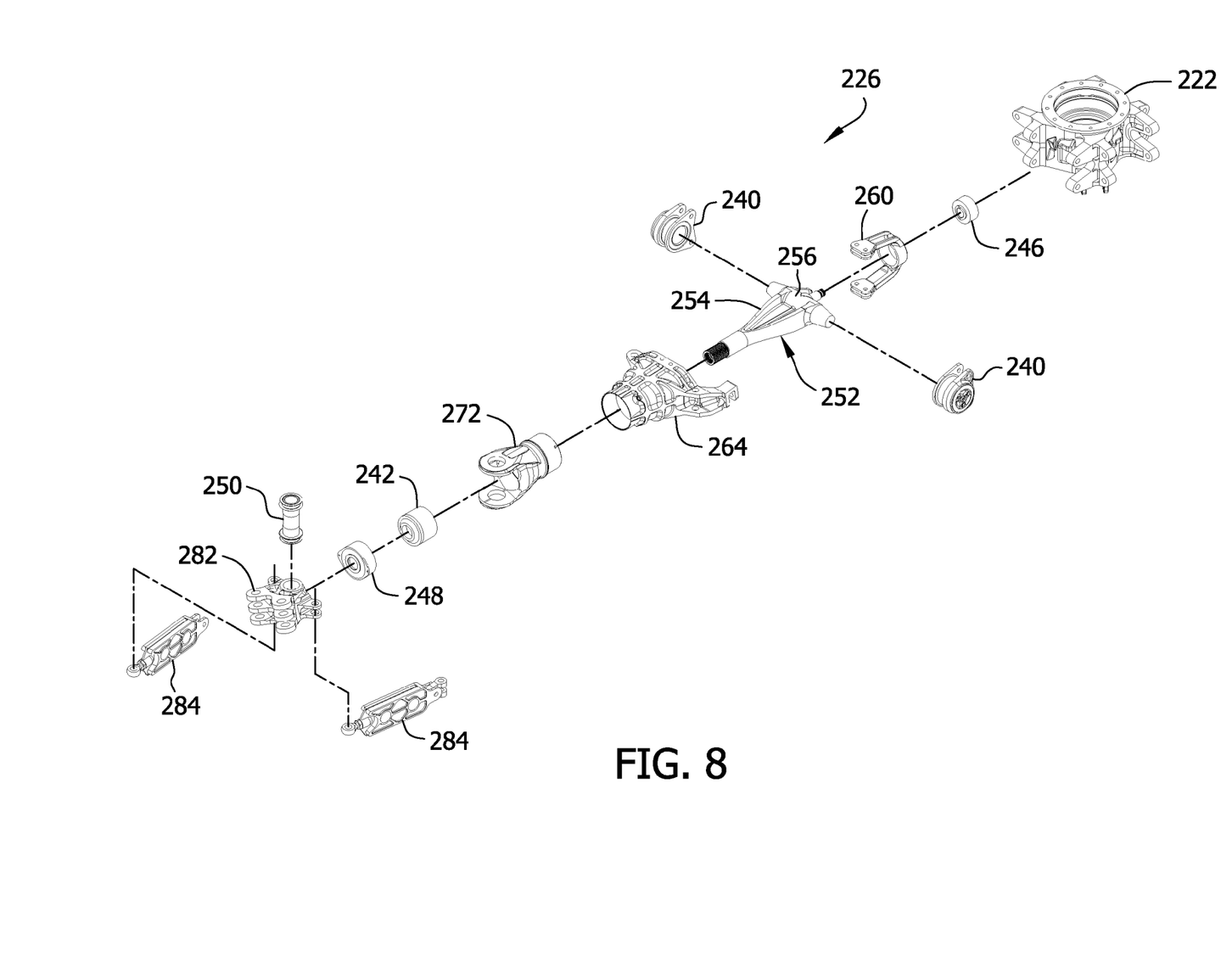
FIG. 8 is an exploded view of the center body and rotor arm assembly shown in FIG. 5.

FIG. 4 is a perspective view of rotor hub system 208 including a center body 222 and a plurality of rotor arm assemblies 224. In the exemplary embodiment, the plurality of rotor arm assemblies 224 includes a first rotor arm assembly 226 configured to couple first rotor blade 214 to hub system 208, a second rotor arm assembly 228 configured to couple second rotor blade 216 to hub system 208, a third rotor arm assembly 230 configured to couple third rotor blade 218 to hub system 208, and a fourth rotor arm assembly 232 configured to couple fourth rotor blade 220 to hub system 208. However, embodiments that incorporate fewer or additional rotor arm assemblies 224 are contemplated. FIG. 5 is a perspective view of center body 222 and first rotor arm assembly 226. FIG. 6 is a cross-sectional side view of center body 222 and first rotor arm assembly 226. FIG. 7 is a cross-sectional top view of center body 222 and first rotor arm assembly 226. FIG. 8 is an exploded view of center body 222 and first rotor arm assembly 226. In the exemplary embodiment, rotor hub system 208 is a fully-articulated rotor system, i.e., a system which rotates about axis 212 and in which each of rotor blades 210 are permitted pitching, flapping and lead-lag movement about a respective pitch axis 234, flap axis 236 and lead-lag axis 238. More specifically, rotor arm assemblies 224 provide a respective rotor blade 210 with a pitch motion about pitch axis 234 in the range of between approximately +/−40° from nominal, a flapping motion about flap axis 236 in the range of between approximately −10° and 30° from nominal, and a lead-lag motion about lead-lag axis 238 in the range of between approximately +/−10° from nominal. Alternatively, rotor arm assemblies may provide for pitch, flapping, and lead-lag motion about respective axes within any range that facilitates operation of rotor arm assemblies 224 as described herein.

In the exemplary implementation, each rotor arm assembly 224 includes a plurality of discrete elastomeric bearings such that no two or more degrees of freedom are facilitated by a single bearing. More specifically, first rotor arm assembly 226 includes a pair of elastomeric flap bearings 240, an elastomeric thrust bearing 242, and a plurality of concentric elastomeric pitch bearings 244 including an inboard pitch bearing 246 and an outboard pitch bearing 248. As used herein, the term "inboard" is meant to describe being closer to center body 222 and rotational axis 212, and the term "outboard" is meant to describe being closer to lead-lag axis 238 and a respective one of the plurality of rotor blades 210. First rotor arm assembly 226 also includes a conventional lead-lag bearing 250, which may be one of a plain bearing or a roller bearing. As described in further detail below, bearings 240, 242, 246, 248, and 250 facilitate providing for a fully articulated modular rotor hub system that is designed to replace known rotor hub systems utilizing metallic roller bearing and strap pack systems.

In the exemplary embodiment, first rotor arm assembly 226 includes a t-shaped pitch shaft 252 that is coupled to center body 222. More specifically, pitch shaft 252 includes a first portion 254 that is substantially aligned with pitch axis 234 and a second portion 256 that is substantially aligned with flap axis 236. Conical or cylindrical elastomeric flap bearings 240 are slidably coupled to opposing ends of second portion 256 and are then coupled to a pair of mounting brackets 258 extending from center body 222. As such, flap bearings 240 and pitch shaft 252 rotate about flap axis 236 such that flap bearings 240 limit pitch shaft 252 to movement within a single degree of freedom, the flapping motion.

Rotor arm assembly 226 also includes inboard elastomeric pitch bearing 246 coupled to pitch shaft first portion 254 inboard of second portion 256 such that inboard pitch bearing 246 is proximate center body 222. Inboard pitch bearing 246 is coupled within a u-shaped housing 260 including a pair of arms 262 that extend outboard around pitch shaft second portion 256. The distal ends of pitch bearing housing arms 262 are each coupled to a pitch shaft cover 264 that at least partially covers first portion 254 of pitch shaft 252 and is configured to protect pitch shaft 252 and carry torsional, chord, and flap loads, while not bearing any of the centrifugal (i.e. thrust) loads induced upon rotor arm assembly 226 during operation. Pitch shaft cover 264 includes a pitch arm 266 that is nominally aligned with flap axis 236, pitch motions and torque are provided by a control pitch link (not shown) connected to pitch arm 266. In the exemplary implementation, the outboard end of pitch shaft cover 264 includes an opening 268 configured to receive an inboard end 270 of a pitch housing 272 therein. Alternatively, pitch housing 272 may be formed integrally with pitch shaft cover 264.

In the exemplary implementation, pitch housing 272 is a load bearing structure, as described in further detail below, and is configured to cover a distal end 274 of first portion 254 of pitch shaft 252 that extends beyond opening 268 of pitch shaft cover 264. Distal end 274 includes an opening configured to receive a thrust bolt 276 therein. Outboard elastomeric pitch bearing 248 is coupled about pitch shaft first portion 254 between distal end 274 and pitch housing 272. Pitch bearing 248 is coupled to pitch shaft 252 as far outboard as possible to optimize (reduce) loads to which pitch bearing 248 must react. Furthermore, elastomeric thrust bearing 242 is coupled to pitch shaft 252 between concentric inboard and outboard pitch bearings 246 and 248. More specifically, thrust bearing 242 is coupled to pitch shaft first portion 254 slightly inboard of outboard pitch bearing 248 such that each of bearings 242, 246, and 248 are aligned with pitch axis 234. In the exemplary implementation, concentric inboard and outboard pitch bearings 246 and 248 and thrust bearing 242 combine to facilitate torsional, or feathering, movement of pitch shaft cover 264 and pitch housing 272 about pitch axis 234. Moreover, flap bearings 240 facilitate movement of pitch shaft cover 264 and pitch housing 272 about flap axis 236. As such, pitch shaft cover 264 and pitch housing 272 are limited to movement in two degrees of freedom, the pitch motion and the flapping motion.

Pitch housing 272 also includes an outboard end 278 that includes a pair of opposing flanges 280 configured to receive at least a portion of a lead-lag link 282 therebetween. Lead-lag link 282 is configured to facilitate coupling first rotor blade 214 to first rotor arm assembly 226. Rotor arm assembly 226 also includes a pair of dampers 284 coupled between an inboard end of pitch shaft cover 264 and lead-lag link 282. Dampers 284 are configured to stabilize movement of lead-lag link 282 about lead-lag axis 238. In the exemplary implementation, each pitch housing flange 280 includes an opening 286 that is concentric with an opening 288 defined through lead-lag link 282. Openings 286 and 288 are aligned with lead-lag axis 238 and are configured to receive lead-lag bearing 250 therein. In the exemplary implementation, lead-lag bearing 250 is a conventional roller bearing. Alternatively, lead-lag bearing 250 may be any type of bearing that facilitates operation of rotor arm assemblies 224 as described herein. In the exemplary implementation, elastomeric and concentric bearings 242, 246, and 248 combine to facilitate torsional, or feathering, movement of lead-lag link 282 about pitch axis 234. Moreover, elastomeric flap bearings 240 facilitate movement of lead-lag link 282 about flap axis 236. Additionally, roller lead-lag bearing 250 facilitates movement of lead-lag link 282 about lead-lag axis 238. As such, lead-lag link 282 is free to move in all three degrees of freedom, the pitch motion, the flapping motion, and the lead-lag motion.

As described herein, each rotor arm assembly 224 of rotor hub system 208 includes discrete elastomeric flap bearings 240 and elastomeric pitch bearings 246 and 248 such that no two or more degrees of freedom are facilitated by a single elastomeric bearing element. More specifically, first rotor arm assembly 226 includes flap bearings 240 that facilitate flapping movement about only flap axis, and inboard and outboard pitch bearings 246 and 248 that combine with elastomeric thrust bearing 242 to facilitate feathering movement about only pitch axis 234. Furthermore, discrete lead-lag bearing 250 facilitates lead-lag movement about only lead-lag axis 238. As such, each bearing 240, 242, 246, 248, and 250 accommodates only a single degree of freedom, which provides for a fully articulated and dynamically stable rotor hub system 208. More specifically, the bearing type and location within each rotor arm assembly 224 as described herein provides for a dynamically stable rotor hub system 208 that does not require active damping, which reduces the complexity, weight and cost of rotor hub system 208.

In the exemplary implementation, each rotor arm assembly 224 reacts to at least three forces acting thereon. The first is a chord shear load, represented by arrow 290 (shown in FIG. 7), acting substantially parallel to flap axis 236. Another force reacted by first rotor arm assembly 226 is a flap shear load, represented by arrow 292, acting substantially parallel to lead-lag axis 238. Yet another force reacted by first arm assembly 226 is a centrifugal force load, represented by arrow 294, acting substantially parallel to pitch axis 234. In the exemplary implementation, load 294 travels along a unique load path 296 through the components of first rotor arm assembly 226. More specifically, lead-lag link 282 transfers load 294 from first rotor blade 214 (shown in FIG. 3) to pitch housing 272. Load path 296 continues through pitch housing 272 to thrust bearing 242 and outboard pitch bearing 248, sequentially, such that pitch shaft cover 264 does not carry load 294. Load 294 is then transferred from pitch bearing 248 into first portion 254 of pitch shaft 252 through thrust bolt 276. Load 294 then travels along first portion 254 to second portion 256 of pitch shaft 252 such that pitch shaft 252 transfers load 294 to flap bearings 240. Load path 296 terminates as flap bearings 240 transfer load 294 to center body 222. Chord and flap shear loads, 290 and 292, originating at the lead-lag link 282, introduce bending moments as well as shear forces in pitch shaft cover 264 and pitch housing 272. These moments and forces are reacted by the couple formed by inboard pitch bearing 246 and outboard pitch bearing 248. Ultimately the pitch bearing couple is transferred to pitch shaft distal end 274 and pitch shaft inboard end near pitch shaft section 256. Finally this resulting pitch shaft couple is transferred to pitch shaft section 256 and is reacted by flap bearings 240 supported by center body 222.

Moreover, rotor hub system 208 is a modular hub system such that various multiple bladed hub systems may be constructed using a single rotor arm assembly design, such as first rotor arm assembly 226, and a corresponding center hub element, such as center body 222. For example, FIG. 4 illustrates rotor hub system 208 having four rotor arm assemblies 224 and a corresponding center body 222 configured to couple to each assembly 224. However, rotor hub system 208 may be a three or five rotor arm system, wherein each rotor arm assembly design of any of the three to five arm rotor hub systems are substantially similar. As such, should one arm assembly be damaged or require servicing, only the damaged arm assembly need be removed from the hub system. In such a case, a spare arm assembly may be quickly and easily mounted to the center body, without removing any of the undamaged rotor arm assemblies from the center body and without removing the rotor hub system from the rotor craft, thus allowing the rotor craft to remain operable while the damaged arm assembly is serviced. Such a modular design reduces rotor craft down time, while also decreases servicing time and costs of the hub system.

From the foregoing it will be seen that there has been shown and described a rotor craft rotor hub system and method of assembly that provide several advantages. The rotor hub system as described herein differs from other known hub systems described above in that each of the plurality of rotor arm assemblies of rotor hub system includes discrete elastomeric pitch and flap bearings that facilitate pitch and flap degrees of freedom, respectively. Furthermore, the centrifugal load is transferred along a unique load path that includes a load bearing pitch housing and a discrete elastomeric thrust bearing. The rotor hub system described herein has a substantially similar footprint and kinematics as known roller bearing hub systems and strap pack hub systems, but is easier to service, particularly in field service scenarios. Accordingly, one embodiment of the exemplary rotor hub system is to retrofit known hub systems with the rotor arm assemblies described herein by designing the rotor arm assemblies to have an attachment point consistent with the attachment points of known hub systems to allow for the use of a similar center body. More specifically, the exemplary rotor hub system may replace a torsion shaft and the metallic roller bearings found in known non-friction hub systems and the strap packs of strap pack hub systems with the combination of a pitch shaft, a discrete elastomeric thrust bearing, and discrete elastomeric pitch bearings.

Replacing metallic roller bearings and strap packs with the pitch shaft and elastomeric bearings retains the substantially similar kinematics and footprint of the known designs, but provides for a less complex and inexpensive hub system. More specifically, unlike known strap pack hubs, the rotor hub system described herein uses common aerospace materials that reduce the costs of manufacturing. Furthermore, should one of elastomeric bearings fail, defined as a complete tear in the elastomer layers, the elastomeric bearings still perform acceptably and are relatively easy to detect due to an increase in vibrations and the ability to easily perform a visual examination. While particular embodiments of the disclosure have been shown and described, it will be understood that the disclosure is not limited thereto since modifications may be made by those skilled in the art, particularly in light of the foregoing teachings. It is therefore contemplated by the following claims to cover any such modifications and incorporate those features which constitute the essential features of these improvements within the spirit and scope of the disclosure.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotor arm assembly for use in a rotor craft rotor hub system, said rotor arm assembly comprising:
   a pitch shaft, wherein said pitch shaft comprises a first portion aligned with a pitch axis and a perpendicular second portion aligned with a flap axis;
   a pitch shaft cover coupled about said pitch shaft;
   a pitch housing coupled to said pitch shaft cover such that at least a portion of said pitch housing is coupled between said pitch shaft cover and said pitch shaft; and
   a plurality of discrete elastomeric bearings coupled to said pitch shaft, wherein said plurality of discrete elastomeric bearings include:
      a pair of flap bearings coupled to said second portion, wherein said pair of flap bearings is configured to facilitate movement of the rotor arm assembly in a first degree of freedom about the flap axis; and
      an inboard pitch bearing coupled inboard of said second portion, and an outboard pitch bearing coupled at an outboard distal end of said first portion, said outboard pitch bearing being concentric with said inboard pitch bearing, wherein said inboard pitch bearing and said outboard pitch bearing are configured to facilitate movement of the rotor arm assembly in a second degree of freedom about the pitch axis, wherein the flap axis and the pitch axis are oriented perpendicularly relative to each other.

2. The rotor arm assembly in accordance with claim 1 further comprising a thrust bearing coupled to said first portion between said inboard and said outboard pitch bearings, wherein said thrust bearing is an elastomeric bearing configured to react to centrifugal thrust loads and facilitate movement about the pitch axis.

3. The rotor arm assembly in accordance with claim 2 wherein said pitch housing is configured to house at least a portion of said first portion of said pitch shaft, wherein said outboard pitch bearing and said thrust bearing are coupled between said pitch housing and said pitch shaft; and
 a lead-lag link coupled to said pitch housing, said lead-lag link comprising a lead-lag bearing configured to facilitate movement about a lead-lag axis.

4. The rotor arm assembly in accordance with claim 1, further comprising an inboard pitch housing coupled to said pitch shaft cover and configured to extend about a portion of said pitch shaft.

5. A rotor hub system for a rotor craft, said rotor hub system comprising:
 a center body configured to rotate about a rotational axis;
 a plurality of rotor arm assemblies configured to couple to said center body, each of said plurality of rotor arm assemblies comprising:
  a pitch shaft, wherein said pitch shaft comprises a first portion aligned with a pitch axis and a perpendicular second portion aligned with a flap axis;
  a pitch shaft cover coupled about said pitch shaft;
  a pitch housing coupled to said pitch shaft cover such that at least a portion of said pitch housing is coupled between said pitch shaft cover and said pitch shaft; and
  a plurality of discrete elastomeric bearings coupled to said pitch shaft, wherein said plurality of discrete elastomeric bearings include:
   a pair of flap bearings coupled to said second portion, wherein said pair of flap bearings is configured to facilitate movement of the rotor arm assembly in a first degree of freedom about the flap axis; and
   an inboard pitch bearing coupled inboard of said second portion, and an outboard pitch bearing coupled at an outboard distal end of said first portion, said outboard pitch bearing being concentric with said inboard pitch bearing, wherein said inboard pitch bearing and said outboard pitch bearing are configured to facilitate movement of the rotor arm assembly in a second degree of freedom about the pitch axis, wherein the flap axis and the pitch axis are oriented perpendicularly relative to each other.

6. The rotor hub system in accordance with claim 5, wherein said plurality of discrete elastomeric bearings comprises
 a thrust bearing coupled to said first portion between said inboard and said outboard pitch bearings, wherein said thrust bearing is an elastomeric bearing configured to react to centrifugal thrust loads and facilitate movement about the pitch axis.

7. The rotor hub system in accordance with claim 6 wherein said pitch housing is configured to house at least a portion of said first portion of said pitch shaft, wherein said outboard pitch bearing and said thrust bearing are coupled between said pitch housing and said pitch shaft; and
 a lead-lag link coupled to said pitch housing, said lead-lag link comprising a lead-lag bearing configured to facilitate movement about a lead-lag axis.

8. The rotor hub system in accordance with claim 6, wherein a load path is sequentially defined through said lead-lag link, said pitch housing, said thrust bearing, said outboard pitch bearing, said pitch shaft, and said pair of flap bearings.

9. The rotor hub system in accordance with claim 5, wherein the plurality of rotor arm assemblies comprises a plurality of first rotor arm assemblies coupled to said center body and at least one second rotor arm assembly uncoupled from said center body, wherein one of said first rotor arm assemblies is replaceable on said center body by said second rotor arm assembly without removing remaining said plurality of first rotor arm assemblies from said center body, wherein said plurality of first rotor arm assemblies are equivalent to said second rotor arm assembly.

10. A method of assembling a rotor arm assembly for use in a rotor craft, said method comprising:
 providing a pitch shaft that includes a first portion and a second portion perpendicular to the first portion;
 coupling a pitch shaft cover about the pitch shaft;
 coupling a pitch housing to the first portion such that at least a portion of the pitch housing is coupled between the pitch shaft cover and the first portion;
 coupling a pair of flap bearings to the second portion, wherein the pair of flap bearings are configured to facilitate movement of the rotor arm assembly in a first degree of freedom about a flap axis;
 coupling an inboard pitch bearing to the first portion inboard of the second portion; and
 coupling an outboard pitch bearing at an outboard distal end of the first portion and concentric with the inboard pitch bearing, wherein the inboard pitch bearing and the outboard pitch bearing are configured to facilitate movement of the rotor arm assembly in a second degree of freedom about a pitch axis oriented perpendicularly relative to the flap axis, wherein the pair of flap bearings, the inboard pitch bearing, and the outboard pitch bearing are discrete elastomeric bearings.

11. The method in accordance with claim 10, wherein coupling a pair of flap bearings further comprises coupling a pair of flap bearings configured to facilitate movement of the rotor arm assembly about only the flap axis; and wherein coupling an inboard and an outboard pitch bearing further comprises coupling an inboard and an outboard pitch bearing that are configured to facilitate movement of the rotor arm assembly about only the pitch axis.

12. The method in accordance with claim 10 further comprising coupling a thrust bearing to the pitch shaft between the inboard and the outboard pitch bearings, wherein the thrust bearing is an elastomeric bearing configured to react centrifugal thrust loads and facilitate movement of the rotor arm assembly about the pitch axis.

13. The method in accordance with claim 12 further comprising:
 coupling a lead-lag link to the pitch housing, wherein the lead-lag link includes a lead-lag bearing configured to facilitate movement about a lead-lag axis, and wherein coupling the outboard pitch bearing and the thrust bearing comprises coupling the outboard pitch bearing and the thrust bearing between the pitch housing and the pitch shaft.

14. The method in accordance with claim 13 further comprising defining a load path that sequentially travels through the lead-lag link, the pitch housing, the thrust bearing, the outboard pitch bearing, the pitch shaft, and the pair of flap bearings.

15. The method in accordance with claim 10 further comprising coupling an inboard pitch bearing housing about the inboard pitch bearing, wherein the pitch bearing housing is a U-shaped housing including a pair of outboard extending arms.

* * * * *